US008953451B2

(12) United States Patent
Conniff (10) Patent No.: US 8,953,451 B2
(45) Date of Patent: Feb. 10, 2015

(54) APPARATUS, METHODS, AND SYSTEMS FOR CHARACTER SET SURVEYING OF NETWORK TRAFFIC

(75) Inventor: James D. Conniff, Yorba Linda, CA (US)

(73) Assignee: The Boeing Company, Chicago, IL (US)

( * ) Notice: Subject to any disclaimer, the term of this patent is extended or adjusted under 35 U.S.C. 154(b) by 175 days.

(21) Appl. No.: 13/523,138

(22) Filed: Jun. 14, 2012

(65) Prior Publication Data

US 2013/0336158 A1    Dec. 19, 2013

(51) Int. Cl.
*H04L 12/28* (2006.01)
*G06F 15/173* (2006.01)
*G06F 15/16* (2006.01)
*G06F 9/00* (2006.01)
*G06F 11/00* (2006.01)
*H04L 12/801* (2013.01)
*H04L 12/26* (2006.01)

(52) U.S. Cl.
CPC .............. *H04L 47/10* (2013.01); *H04L 43/00* (2013.01)
USPC ........... 370/235; 370/401; 709/224; 709/249; 726/13; 726/22

(58) Field of Classification Search
CPC ......... H04L 47/10; H04L 47/35; H04L 47/30; H04L 47/32; H04L 12/5602; H04L 47/27; H04L 2012/5635; H04L 2012/5636; H04L 43/026; H04L 43/50; H04L 12/56; H04L 2012/56; H04L 12/66; H04L 12/2602; H04L 12/5693; H04L 29/06; H04L 29/06027; H04L 29/06068; H04L 29/08072; H04L 41/22; H04L 43/00; H04L 45/00; H04L 47/2441; H04L 47/351; H04L 63/145; H04L 63/0227; H04L 63/0236; H04L 63/0263; H04L 63/1408; H04L 63/1416; H04L 63/1441; H04L 63/1458
USPC ......... 370/235, 241, 252, 253, 300, 301, 341, 370/349, 352, 353, 389, 401; 706/46; 709/224, 249; 726/13, 22

See application file for complete search history.

(56) References Cited

U.S. PATENT DOCUMENTS

| 5,257,319 | A  | * | 10/1993 | Canu et al. ..................... 382/139 |
| 8,615,159 | B2 | * | 12/2013 | Ryman et al. ................. 386/244 |
| 2005/0184886 | A1 | * | 8/2005 | Fauque .......................... 341/50 |
| 2005/0238010 | A1 |  | 10/2005 | Panigrahy et al. |
| 2008/0198759 | A1 | * | 8/2008 | Harmel et al. ................ 370/252 |

(Continued)

FOREIGN PATENT DOCUMENTS

WO    2010/023645 A1    3/2010

OTHER PUBLICATIONS

European Search Report issued in European Patent Application No. EP 13 16 9040, mailed Sep. 6, 2013, 8 pages.

*Primary Examiner* — Alpus H Hsu
*Assistant Examiner* — Dharmesh Patel
(74) *Attorney, Agent, or Firm* — Armstrong Teasdale LLP (57) ABSTRACT

Apparatus, methods, and systems for use in analyzing a flow of network traffic between a first network and a second network are provided. One example method includes scanning the network traffic between the first and second networks. The network traffic includes a plurality of data packets. The method includes determining a character set included in each of the plurality of data packets, and storing an indication of each character set included in each scanned data packet.

16 Claims, 4 Drawing Sheets

(56) References Cited

U.S. PATENT DOCUMENTS

| | | |
|---|---|---|
| 2010/0054278 A1* | 3/2010 | Stolfo et al. ................ 370/474 |
| 2010/0161536 A1 | 6/2010 | Clark et al. |
| 2011/0051614 A1* | 3/2011 | Li et al. ........................ 370/252 |
| 2011/0066729 A1* | 3/2011 | Lund et al. ................... 709/226 |
| 2011/0154472 A1* | 6/2011 | Anderson et al. .............. 726/11 |
| 2011/0248914 A1* | 10/2011 | Sherr ........................... 345/156 |
| 2011/0255408 A1 | 10/2011 | Aybay et al. |
| 2011/0305141 A1 | 12/2011 | Horovitz |

* cited by examiner

APPARATUS, METHODS, AND SYSTEMS FOR CHARACTER SET SURVEYING OF NETWORK TRAFFIC

BACKGROUND

The field of the disclosure relates generally to network traffic analysis and, more specifically, to apparatus, methods, and systems for use in surveying the character sets used in network traffic.

Network traffic analyzers, sometimes referred to as deep-packet inspection systems, are sometimes used to scan network traffic on a computer network and capture traffic of interest. In some systems, one of the capture criteria is a keyword match. For instance, all network traffic with the term "dirty bomb" could be captured using a deep-packet inspection system.

However, network traffic need not, and often doesn't, contain only a single language. Moreover, there exist numerous character sets that are used to encode, or represent, characters in digital communication. For example, the Unicode Standard is a character coding system propagated by the Unicode Consortium and designed to support the worldwide interchange, processing, and display of the written texts. There are over 250 standard Unicode character sets. Different languages may be encoded using the same or different character sets. Accordingly, a key word entered in a first language may not be located in a network traffic data packet encoded with a different character set, whether or not the language is the same.

BRIEF DESCRIPTION

In one aspect, a network traffic analyzer for use in analyzing a flow of network traffic between a first network and a second network is provided. The network traffic analyzer includes a first interface configured for connection to the first network, a second interface configured for connection to the second network, and a controller coupled to the first and second interfaces. The controller is configured to scan the network traffic between the first and second networks. The network traffic includes a plurality of data packets. The controller is configured to determine a character set included in each of the plurality of data packets, and store an indication of each character set included in each scanned data packet.

In another aspect, a method for use in analyzing a flow of network traffic between a first network and a second network is provided. The method includes scanning the network traffic between the first and second networks. The network traffic includes a plurality of data packets. The method includes determining a character set included in each of the plurality of data packets, and storing an indication of each character set included in each scanned data packet.

In yet another aspect, a network traffic analysis system for use in analyzing a flow of network traffic between a first network and a second network, is provided. The system includes a network traffic analyzer coupled to the first and second networks. The network traffic analyzer includes a field-programmable gate array (FPGA), and a remote computing device communicatively coupled to the network traffic analyzer. The FPGA is configured to determine a character set included in each of a plurality of data packets flowing between the first and second networks, and store an indication of each character set included in each scanned data packet. The remote computing device is configured to instruct the network traffic analyzer to determine the character set included in each data packet flowing between the first and second networks in response to selection by a user of the remote computing device to begin traffic analysis.

The features, functions, and advantages that have been discussed can be achieved independently in various embodiments or may be combined in yet other embodiments further details of which can be seen with reference to the following description and drawings.

DETAILED DESCRIPTION

The embodiments described herein are directed apparatus, methods, and systems for use in scanning network traffic between two networks and identifying the character sets included in data packets traveling between the two networks. Once such a survey of network traffic is completed, the results may be used to target the character sets being used in the data packets within the network traffic. For example, key words used in a deep packet inspection system may be translated and/or transliterated into the character sets identified in the network traffic and/or into the languages that utilize the character sets that have been identified in the network traffic by the embodiments described herein.

Figure 1:
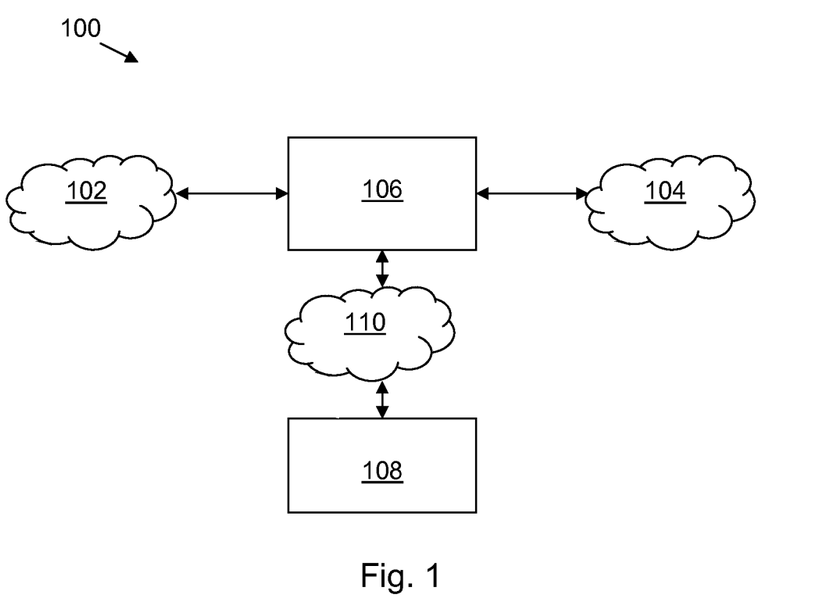
FIG. 1 is a block diagram of an exemplary network traffic analysis system.

FIG. 1 is a block diagram of an exemplary network traffic analysis system, generally indicated by reference number 100 for use in analyzing a flow of network traffic between a first network 102 and a second network 104. System 100 includes a network traffic analyzer 106 coupled to the first and second networks 102 and 104. A remote computing device 108 is communicatively coupled to network traffic analyzer 106.

First network 102 and second network 104 are interconnected computer networks. For example, networks 102 and 104 may include one or more of a personal area network (PAN), a wide area network (WAN), a local area network (LAN), a metropolitan area network (MAN), an enterprise network, an internetwork, the Internet, etc. Moreover, first network 102 and second network 104 may be different parts of the same network, with analyzer 106 coupled between the different parts of the network. Electronic, digital traffic flows between first network 102 and second network 104. This network traffic includes, for example, email messages, instant messages, text messages, documents and/or other files being transferred from one or more computer to one or more other computers, streaming media content.

Network traffic on and between networks 102 and 104 is transmitted in a plurality of data packets. A data packet generally includes of two kinds of data: control information and user data (also referred to as a payload). The control information provides data needed to deliver the payload. For example, the control information may include source and destination addresses, error detection codes, and sequencing information. Control information is generally found in data packet headers and trailers, with payload data in between. The payload of a packet contains the information being transmitted by the packet. For example, the payload of a data packet may include the encoded text of a message one person is sending to another (both of whom are identified generally by the control information).

As described above, different character sets may be used to encode textual data in a computer network. Network traffic analyzer 106 is configured to determine a character set included in each of a plurality of data packets flowing between the first and second networks 102 and 104. Network traffic analyzer 106 then stores an indication of each character set included in each scanned data packet. In the exemplary embodiment, network traffic analyzer 106 stores an indication of each character set included in each scanned data packet by incrementing a count associated with the identified character set. Thus, when a scan is completed, network traffic analyzer 106 will have created an identification of all character sets identified during a scan of data packets, with each identified character set being associated with a total number of packets that included that character set. In other embodiments, network traffic analyzer 106 may store an indication of each character set included in each scanned packet in any other suitable manner including, for example, by storing a separate data record for each scanned data packet.

Remote computing device 108 is located remote from, but communicatively coupled to, network traffic analyzer 106. In the exemplary embodiment, remote computing device is coupled to network traffic analyzer 106 via a third network 110. In other embodiments, remote computing device 108 is coupled to network traffic analyzer 106 other by any other suitable connection, including being directly coupled to network traffic analyzer 106. Remote computing device 108 is configured to instruct network traffic analyzer 106 to determine the character set(s) included in each data packet flowing between first and second networks 102 and 104 in response to selection by a user (not shown in FIG. 1) of remote computing device 108 to begin traffic analysis.

In the exemplary embodiment, remote computing device 108 is configured to request from network traffic analyzer 106 the results of the network traffic survey, e.g. the stored data identifying the character sets included in each scanned packet. Moreover, network traffic analyzer 106 is configured to transmit the stored data to remote computing device 108 in response to the request. In other embodiments, network traffic analyzer 106 transmits the data to remote computing device 108 without waiting for a request for the data, such as at set intervals, upon completion of a scan of a predetermined length, upon acquisition of a predetermined amount of data, etc. The data and/or a summary of the data may be displayed to a user of remote computing device 108 on a display device (not shown in FIG. 1). For instance, in some embodiments remote computing device 108 includes a display device and remote computing device 108 is configured to cause indications of each character set included in the scanned packets to be displayed on the display device. In the exemplary embodiment, remote computing device 108 is configured to generate a summary of the data. The summary includes an identification of each character set identified in the network traffic, the number of packets including each data packet, and the percentage of scanned packets that included the character set. In some embodiments, the identification of the character set includes a name of the character set and a Unicode identifier of the character set.

In another example, a controller of network traffic analyzer 106 includes a communication connection configured for communicative coupling to remote computing device 108. The controller is configured to receive commands from remote computing device 108 and transmit stored indications of each character set included in each scanned data packet to remote computing device 108. In one variant, each data packet includes payload area. A first subset of known character sets encodes a character with a first number of bytes. The character set included in each of a plurality of data packets is determined by, comparing a plurality of groups of the first number of bytes of content of the payload area of each data packet to the first subset of known character sets. In yet another variant, stored indications of each character set included in each scanned data packet are transmitted to remote computing device.

Figure 2:
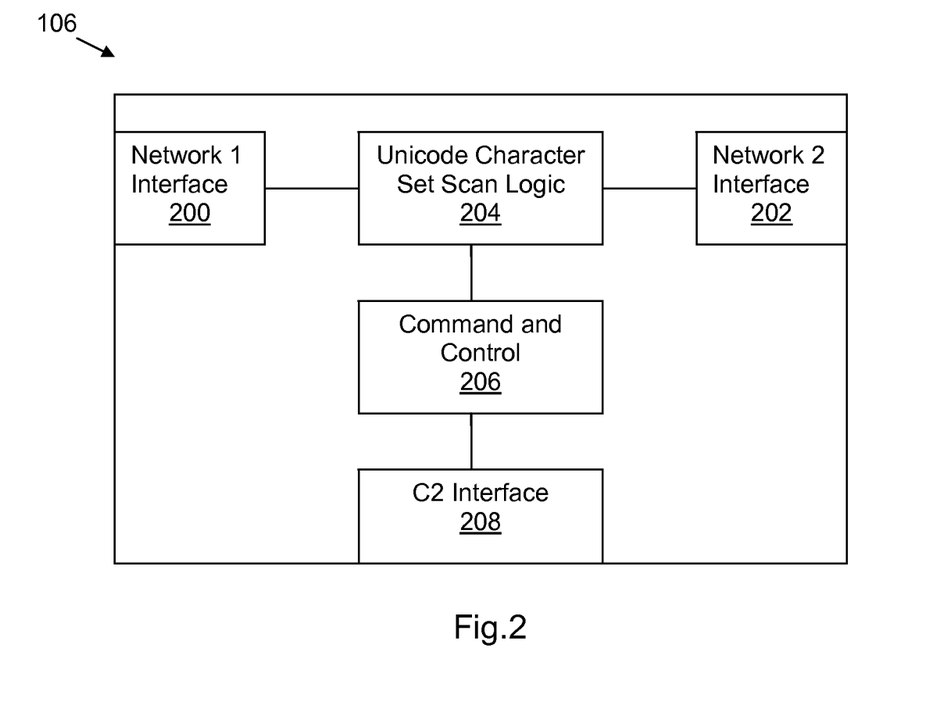
FIG. 2 is a block diagram of an exemplary network traffic analyzer for use in the system shown in FIG. 1.

In yet another instance, network traffic analyzer 106 is configured to determine a character set included in each of a plurality of data packets by comparing payload data to a plurality of subsets of known character sets. For each subset, payload data is compared in groups of data having a byte size equal to the number of bytes used to encode one character in the subset of known character sets FIG. 2 is a functional block diagram of an exemplary embodiment of network traffic analyzer 106 for use in system 100 (shown in FIG. 1). Network traffic analyzer 106 includes a first network interface 200 and a second network interface 202. Network interfaces 200 and 202 are each configured for communicative coupling to a computer network. In the exemplary embodiment, network interfaces 200 and 202 include wired 10/100/1000 Mbps magnetics and PHY. In other embodiments, other types of interfaces including, for example, wireless interfaces. In system 100, first network interface 200 is coupled to first network 102, and second network interface 202 is coupled to second network 104. Network interfaces 200 and 202 are coupled to each other via character set scan logic 204. Network traffic between networks coupled to first network interface 200 and second network interface 202 is scanned by character set scan logic 204 as it passes thorough network traffic analyzer 106. Network traffic analyzer 106 does not interrupt the bi-directional flow of network traffic between first and second network interfaces 200 and 202. As will be described in more detail below, character set scan logic 204 scans each data packet passing through network traffic analyzer 106 in real-time and identifies the character set(s) included in each data packet. Command and control block 206 is coupled to character set scan logic 204 and controls starting and stopping of a scan of network traffic by character set scan logic 204. Moreover, command and control block 206 receives the results of the scan, i.e., the indications of the character set(s) included in the network traffic, from character scan logic 204. In some embodiments, command and control block 206 includes a memory device (not shown) and the scan results are stored by command and control block 206 in the memory device. In some embodiments, scan logic 204 and command and control block 206 may be referred to as a controller. Moreover, in some embodiments, scan logic 204 and control block 206 are implemented in a single controller. C2 interface 208 is configured for coupling network traffic analyzer 106 to remote computing device 108. In the exemplary embodiment, C2 interface 208 includes a network interface similar to interfaces 200 and 202. In other embodiments, C2 interface 208 is any suitable interface for communicatively coupling network traffic analyzer 106 to remote computing device 108 including, for example, a wireless network interface.

In an exemplary embodiment, network traffic analyzer 106 is implemented by a field-programmable gate array (FPGA), sometimes also generally referred to herein as a controller. Character scan logic 204 is implemented by the FPGA, and command and control block 206 is embedded software in the FPGA. In other embodiments, network traffic analyzer 106 may include any other suitable controller and/or hardware platform including, for example, an application-specific integrated circuit (ASIC). In some embodiments, network traffic analyzer 106 may include a general purpose computer with character scan logic 204 and command and control block 206 implemented in software. Some software implemented embodiments may not be able to scan the network traffic and identify the character sets in real time (e.g., at line speed) and may be configured to store network traffic and perform scanning and determination of character sets at a later time.

Figure 3:
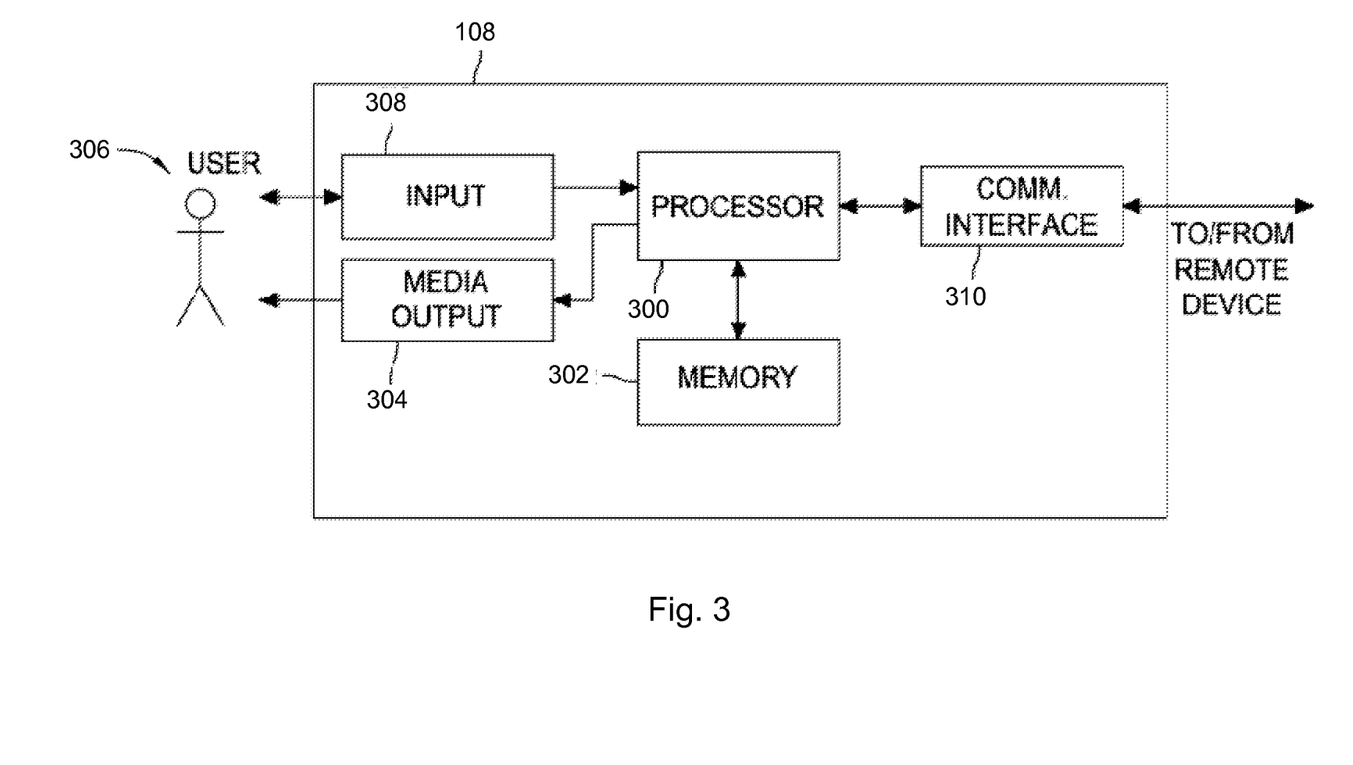
FIG. 3 is a block diagram of a remote computing device for use in the system shown in FIG. 1.

FIG. 3 is an exemplary configuration of remote computing device 108. Remote computing device 108 includes a processor 300 for executing instructions. In some embodiments, executable instructions are stored in a memory area 302. Processor 300 may include one or more processing units (e.g., in a multi-core configuration). Memory area 302 is any device allowing information such as executable instructions and/or other data to be stored and retrieved. Memory area 302 may include one or more computer readable media. In the exemplary embodiment, character set data received from network traffic analyzer 106 and/or summaries of the data are stored in memory area 302. In other embodiments, the data and/or summaries are stored in a memory device other than memory area 302. In the exemplary embodiment, computer readable instructions to permit remote computing device 108 to operate as described herein are stored in memory area 302.

Remote computing device 108 also includes at least one media output component 304 for presenting information to a user 306. Media output component 304 is any component capable of conveying information to user 306. In some embodiments, media output component 304 includes an output adapter such as a video adapter and/or an audio adapter. An output adapter is operatively coupled to processor 300 and operatively couplable to an output device such as a display device (e.g., a liquid crystal display (LCD), organic light emitting diode (OLED) display, cathode ray tube (CRT), or "electronic ink" display) and/or an audio output device (e.g., a speaker or headphones).

In some embodiments, remote computing device 108 includes an input device 308 for receiving input from user 306. Input device 308 may include, for example, a keyboard, a scanner, a pointing device, a mouse, a stylus, a touch sensitive panel (e.g., a touch pad or a touch screen), a gyroscope, an accelerometer, a position detector, camera, or an audio input device. A single component such as a touch screen may function as both an output device of media output component 304 and input device 308. Moreover, in some embodiments, remote computing device 108 includes more than one input device 308 for receiving input from user 306. For example, computer device may include a keyboard, a touch sensitive panel, and a scanner.

Remote computing device 108 includes a communication interface 310, which is communicatively couplable to a remote device such as network traffic analyzer 106. Communication interface 310 may include, for example, a wired or wireless network adapter or a wireless data transceiver for use with a mobile phone network (e.g., Global System for Mobile communications (GSM), Code Division Multiple Access (CDMA), 3G, 4G or Bluetooth) or other mobile data network (e.g., Worldwide Interoperability for Microwave Access (WIMAX)).

Figure 4:
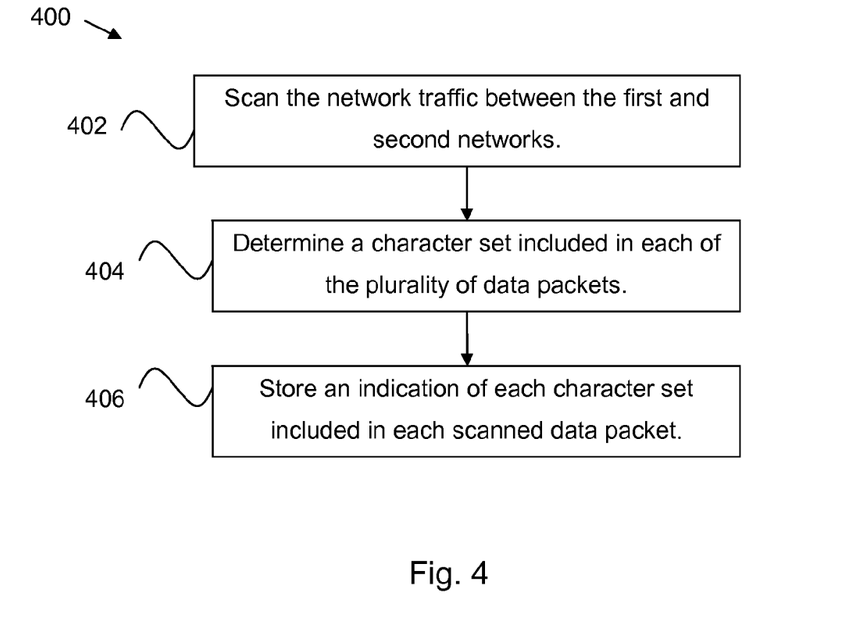
FIG. 4 is a flow diagram of an exemplary method that may be used with the system shown in FIG. 1.

FIG. 4 is a flow chart of an exemplary method 400 for use in analyzing a flow of traffic between a first network and a second network, for example between first and second networks 102 and 104. Method 400 includes scanning 402, such as with network traffic analyzer 106, the network traffic between the first and second networks. The network traffic includes a plurality of data packets. The method includes determining 404 a character set included in each of the plurality of data packets, and storing 406 an indication of each character set included in each scanned data packet.

Figure 5:
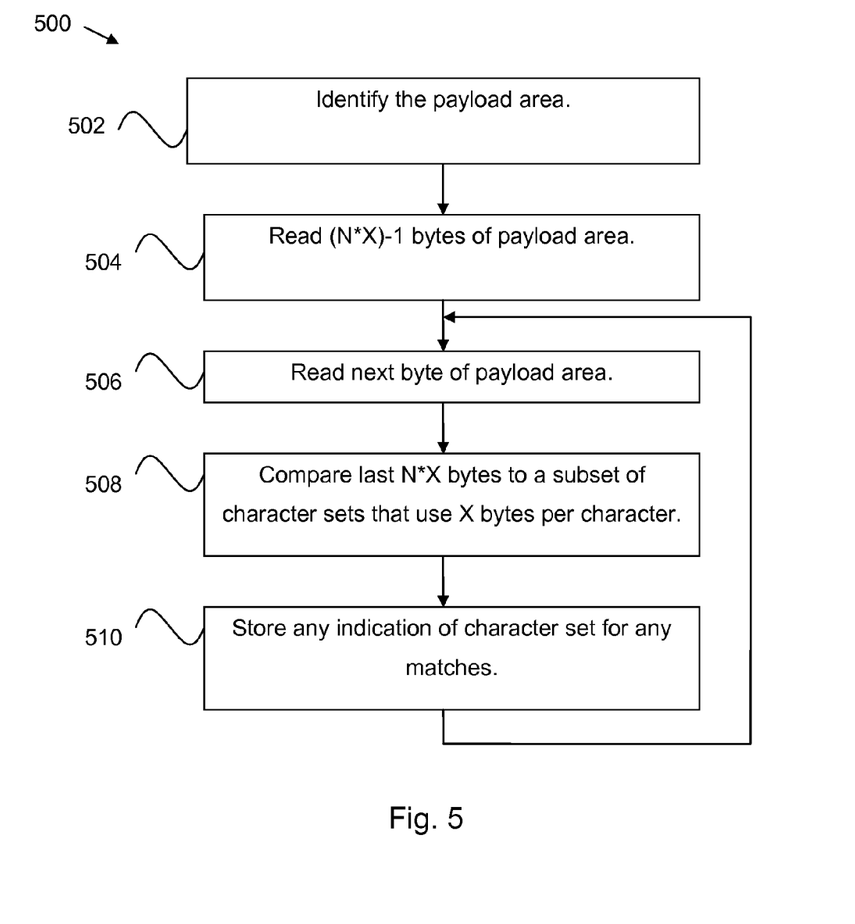
FIG. 5 is a flow diagram of an exemplary method for use in determining a character set included in data packets of network traffic

FIG. 5 is a flow chart of an exemplary method 500 for use in determining a character set included in data packets of network traffic. Method 500 may be performed, for example, by network traffic analyzer 106. Generally, a number of characters in a payload area of each data packet are read and compared to a subset of known character sets to identify matches. By comparing groups of bytes (which encode groups of characters) to known character sets, accuracy may be improved and random improper matches may be reduced. The number of characters read and compared in method 500 may be varied. Using fewer characters may increase processing speed at the expense of accuracy, while greater numbers of characters may decrease speed and increase accuracy. In one example embodiment, groups of bytes representing five characters are read and compared. In FIG. 5, the number of characters that are to be read and compared is represented by "N".

As discussed above, different character sets utilize a different number of bytes to represent a single character. Thus, the number of bytes needed to be read in order to read N characters will vary depending on the character set. Some common character sets utilize one byte per character, others utilize two bytes per character, and still others utilize four bytes per character. Character sets that utilize a same number of bytes to encode a single character are grouped into subsets. In FIG. 5, the number of bytes used to encode a single character in a particular subset of character sets is represented by "X". Accordingly, the number of bytes that needs to be read to read N characters of a payload is N*X bytes of the payload.

Specifically, method 500 begins by identifying 502 the payload area of a packet of data. One less byte than N times X number of bytes of the payload is read 504. The next byte of the payload is then read 506. The last N characters, as encoded in N time X bytes, of the payload area that were read are then compared 508 to the subset of character sets that use X bytes per character. If any matches are identified, an indication of the match is stored 510. Method 500 then returns to read 506 the next byte of the payload area an repeat comparing 508 and storing until all bytes in the payload area have been read and compared. In other embodiments, method 500 may end, for a particular data packet, once a match with a character set has been identified. In the exemplary embodiment, network traffic analyzer 106 performs method 500 for each subset of character sets in parallel. In other embodiments, method 500 may be performed sequentially rather than in parallel. In still other embodiments, method 500 maybe performed on a data packet for each subset sequentially until a match is found.

An example application of method 500 will now be described. In this example, the possible character sets include three subsets. A first subset uses one byte to encode one character (i.e., X=1), a second subset uses two bytes to encode a character (i.e., X=2), and a third subset uses four bytes to encode a character (i.e., X=4). The payload of each packet is to be read and compared in groups of five characters. Thus, N equals 5. After the payload area is identified, the bytes of the payload are read sequentially. For the first subset, the first four bytes of the payload are read. After the fifth byte is read, the first five bytes of the payload area are compared to the character sets of the first subset. If any matches are identified, an indication of such is stored. The next byte in the payload is then read and the last five bytes that were read (i.e., bytes two through six) are compared to the character sets of the first subset. If any matches are identified, an indication of such is stored. This is repeated until all data in the payload has been read and compared. In parallel with this, the second subset of character sets is matched to the payload. Once the first ten bytes of the payload have been read, the ten bytes are compared to the character sets of subset two. Any identified matches are stored and the next byte is read. The last ten bytes read (i.e., bytes two through eleven) are compared with the character sets of subset two. Similarly, groups of twenty bytes of the payload, representing five characters in subset 3 character sets, are read and compared to the character sets in subset 3. The reading and comparison continues for all three subsets until all of the data in the payload has been read. This process is then repeated on the next data packet received. In yet another example, a controller may be configured to compare the content of a payload area to plurality of known character sets by comparing groups of a first number of bytes of the content to first subset of the known character sets. The first number of bytes is whole number multiple of the number of bytes with which first subset of known character sets encodes single character.

A technical effect of the apparatus, methods, and systems described herein may include one or more of: (a) scanning network traffic between first and second networks; (b) determining a character set included in each of a plurality of data packets; and storing an indication of each character set included in each scanned data packet.

Embodiments described herein enable surveying the character sets included in network traffic between computer networks and/or within a network. Character sets are identified for each data packet that is monitored. The identification occurs in real-time and at line speed. No packets need to be delayed, stored, or otherwise interfered with. Moreover, the collected character set data may be transmitted to a remote computing device for review and/or storage. Summaries of the character sets identified may be prepared and presented to a user. The collected data may be used for any suitable purpose including, for example, determining into what languages and/or character sets that keywords for a deep packet inspection system should be translated and/or transliterated.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A network traffic analyzer for use in analyzing a flow of network traffic between a first network and a second network, said network traffic analyzer comprising:
   a first interface configured for connection to the first network;
   a second interface configured for connection to the second network;
   a controller coupled to said first and second interfaces, said controller configured to:
   scan the network traffic between the first and second networks, wherein the network traffic includes a plurality of data packets;
   determine, for each data packet of the plurality of data packets, a character set used to encode at least one character included in the data packet by identifying a payload area of each data packet and comparing content of the payload area to a plurality of known character sets, wherein said controller is configured to compare content of the payload area to the plurality of known character sets by comparing groups of a first number of bytes of the content to a first subset of the known character sets, wherein the first number of bytes is a whole number multiple of a number of bytes with which a first subset of the known character sets encodes a single character; and
   store an indication of each determined character set.

2. The network traffic analyzer of claim 1, wherein said controller is configured to scan network traffic between the first and second networks without interrupting the network traffic between the first and second networks.

3. The network traffic analyzer of claim 1, wherein said controller is configured to repeat the comparing the groups of the first number of bytes of the content to the first subset of the known character sets until substantially all bytes of the payload area have been compared to the first subset of the known character sets.

4. The network traffic analyzer of claim 3, wherein said controller is further configured to compare content of the payload area to the plurality of known character sets by comparing groups of a second number of bytes of the content to a second subset of the known character sets, wherein the second number of bytes differs from the first number of bytes, and the second number of bytes is a whole number multiple of a number of bytes with which a second subset of the known character sets encodes a single character.

5. The network traffic analyzer of claim 4, wherein said controller is configured to repeat the comparing the groups of the second number of bytes of the content to the second subset of the known character sets until substantially all bytes of the payload area have been compared to the second subset of the known character sets.

6. The network traffic analyzer of claim 1, wherein said controller comprises a field-programmable gate array (FPGA).

7. The network traffic analyzer of claim 1, wherein said controller comprises a communication connection configured for communicative coupling to a remote computing device, wherein said controller is configured to receive commands from the remote computing device and transmit the stored indications of each character set included in each scanned data packet to the remote computing device.

8. A method for use in analyzing a flow of network traffic between a first network and a second network, said method comprising:
   scanning the network traffic between the first and second networks, wherein the network traffic includes a plurality of data packets and each data packet includes a payload area;
   determining, for each data packet of the plurality of data packets, a character set used to encode at least one character included in the data packet, wherein determining the character set comprises comparing a plurality of groups of a first number of bytes of content of the payload area of each data packet to a first subset of known character sets, wherein the first subset of the known character sets encodes a character with the first number of bytes; and
   storing an indication of each determined character set.

9. The method of claim 8, comprising repeating the comparing the groups of the first number of bytes of content to the first subset of the known character sets until substantially all bytes of the payload area have been compared to the first subset of the known character sets.

10. The method of claim 9, wherein said determining the character set comprises comparing a plurality of groups of a second number of bytes of content of the payload area of each data packet to a second subset of the known character sets, wherein the second number of bytes differs from the first number of bytes and the second subset of the known character sets encodes a character with the second number of bytes.

11. The method of claim 10, comprising repeating the comparing the comparing the groups of the second number of bytes of the content to the second subset of the known character sets until substantially all bytes of the payload area have been compared to the second subset of the known character sets.

12. The method of claim 11, further comprising transmitting the stored indications of each determined character set to a remote computing device.

13. A network traffic analysis system for use in analyzing a flow of network traffic between a first network and a second network, said system comprising:
- a network traffic analyzer coupled to the first and second networks, the network traffic analyzer comprising a field-programmable gate array (FPGA) configured to:
  - determine, for each data packet of a plurality of data packets flowing between the first and second networks, a character set used to encode at least one character included in the data packet, wherein said network traffic analyser determines the character set by comparing payload data in each packet to a plurality of subsets of known character sets, wherein for each subset, the payload data is compared in groups of data having a byte size equal to a number of bytes used to encode one character in said subset of known character sets; and
  - store an indication of each determined character set; and
- a remote computing device communicatively coupled to said network traffic analyzer, said remote computing device configured to:
  - instruct said network traffic analyzer to determine the character set used to encode at least one character included in the data packet in response to selection by a user of said remote computing device to begin traffic analysis.

14. The system of claim 13, wherein said remote computing device is further configured to:
- request from said network traffic analyzer the stored indications of each determined character set.

15. The system of claim 14, wherein said remote computing device further comprises a display device and wherein said remote computing device is configured to cause the requested indications of each determined character set to be displayed on said display device.

16. The system of claim 13, wherein said network traffic analyzer is configured to compare the payload data to the plurality of subsets of known character sets in parallel.

\* \* \* \* \*